United States Patent
Romano et al.

(10) Patent No.: US 6,654,219 B1
(45) Date of Patent: Nov. 25, 2003

(54) ARC FAULT DETECTOR WITH DIAGNOSTIC INDICATOR

(75) Inventors: James P. Romano, Syracuse, NY (US); Jeffrey C. Richards, Baldwinsville, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 154 days.

(21) Appl. No.: 10/016,422

(22) Filed: Dec. 11, 2001

Related U.S. Application Data

(60) Provisional application No. 60/254,730, filed on Dec. 11, 2000.

(51) Int. Cl.$^7$ .................................................. H02H 3/18
(52) U.S. Cl. ......................................... 361/78; 324/500
(58) Field of Search ............................. 361/18, 42, 58, 361/62, 78, 79, 93.1, 115; 324/533, 528, 500, 509, 522, 527, 512

(56) References Cited

U.S. PATENT DOCUMENTS 5,083,086 A * 1/1992 Steiner
5,886,861 A * 3/1999 Parry
5,986,860 A * 11/1999 Scott \* cited by examiner

*Primary Examiner*—Edward H. Tso
(74) *Attorney, Agent, or Firm*—Wall Marjama & Bilinski LLP

(57) ABSTRACT

A protection device for an electrical circuit having a load includes a sensor operatively associated with the electrical circuit to sense current changes and voltage fluctuations in the electrical circuit. A detector receives input from the sensor and compares the input to known arc fault signatures and arc fault mimicking signatures to determine what category of arc fault or mimicked arc fault occurs. The detector then produces an encoded output signal indicative of the category of arc fault or mimicked arc fault. Categories of arc faults include upstream or downstream series, downstream parallel, downstream line to line, and downstream line to ground.

54 Claims, 3 Drawing Sheets

ARC FAULT DETECTOR WITH DIAGNOSTIC INDICATOR

CROSS-REFERENCE TO RELATED APPLICATIONS

This application claims priority from U.S. Provisional Application Ser. No. 60/254,730 filed Dec. 11, 2000 and entitled ARC FAULT DETECTOR WITH DIAGNOSTIC INDICATOR, incorporated herein by reference.

FIELD OF THE INVENTION

This invention relates generally to the field of arc fault detectors, and more particularly to an arc fault detector that indicates what type of arc fault is detected.

BACKGROUND OF THE INVENTION

The Underwriters Laboratories requirements for the family of arc fault circuit interrupters, as defined in their standard 1699, require the device to sense a variety of arcing conditions within a branch circuit of an AC electrical power distribution system and in appliance conductors receiving power therefrom, to be referred to as an electrical circuit, and to interrupt the flow of electrical current before an arcing condition causes flammable ignition of nearby combustibles. The ability to locate the arcing condition in the electrical circuit to mediate repair is often difficult since the arcing condition could be occurring in a portion of the electrical circuit that is hidden behind sheet rock or that is in a remote space. Even if the arcing condition is occurring in a visible portion of the electrical circuit, visibility of the arc could be denied by the arc fault circuit interrupter itself because of interrupting the arc before the arc becomes visible.

Arc faults known as "A-type" are those in which the arcing condition occurs across a discontinuity in the line or neutral conductor of the electrical circuit. Such discontinuities include a broken conductor, a frayed cord set, a loose terminal, or a poor connection within a wire nut. An A-type arc fault occurs when load current conducts intermittently through the discontinuity, commonly known as "sputtering current." Since the current through the A-type fault is limited by the impedance of the load itself, because the fault is in series with the load, an A-type fault is also known as a "series fault."

Arc faults known as "B-type" are a second type of arc fault condition. In a B-type arc fault, the arc occurs across two conductors in the branch circuit or any extension cords plugged into it, at a site where the insulating media separating the two conductors has been compromised. The arc may occur across the line and neutral conductors or the line and ground conductors, or in the case of reverse polarity where the line and neutral conductors are connected to the supply voltage in reverse, the arc may occur across the neutral and ground conductors. The current through the B-type fault is not limited by the impedance of the load, but instead by the available current from the supply voltage as limited by the loop impedance of the conductors and terminals between the source of supply voltage and the position of the parallel fault, i.e., specifically by the impedance of the conductive members carrying the fault current. Since B-type faults are effectively across the line, they have been known as "parallel faults."

The arc fault circuit interrupter may be incorporated in various housings associated with electrical circuits including receptacles, circuit breakers, boxes devoid of receptacles, or plugs. Each device has a line side, also known as the upstream side, from which electrical power is received from the electrical power distribution system, and a load side, also known as the downstream side, from which electrical power is conveyed to a load.

Various circuit interrupters protect wiring circuits at different locations. Underwriters Laboratories requires downstream parallel arc faults to be interrupted by these devices: branch feeder arc fault circuit interrupter, combination arc fault circuit interrupter, outlet branch circuit arc fault interrupter, and outlet plug arc fault circuit interrupter. Loop currents in upstream parallel arc faults are not interruptible by the arc fault circuit interrupter because interrupting the circuit downstream of a parallel arc fault has no effect on the fault.

The arc fault devices must detect parallel arc faults in which the available current to the parallel fault is as high as 500 amperes, above which the overcurrent device (fuse or circuit breaker) has been determined to afford protection. Since the parallel arc fault current is established by the value of the loop impedance, the lowest value of parallel arc fault current is typically considered to be 75 amperes.

The combination arc fault circuit interrupter, the outlet branch circuit interrupter, and outlet arc fault circuit interrupter are required by UL to detect series faults in which the load is as low as 5 amperes, which was determined by UL to be the lowest current at which the risk of ignition of nearby combustibles is likely to occur. The highest series arc fault current slightly exceeds the rating of the upstream overcurrent device required by code to protect the branch circuit, for example, 30 amperes. For each of these types of arc fault circuit interrupters, the discontinuity, or series fault, can be upstream or downstream of the device.

Considering both series and parallel arc faults, the AFCI's must be able to cover a range of fault currents from 5 amperes to 500 amperes. The test methodologies in the UL standard for generating series and parallel arc faults differ in order to establish the two different types of faults. The standard allows for a longer interrupting time of the AFCI for lower energy series arcs than for higher energy parallel arcs, without sacrificing the protective benefit or risking ignition of nearby combustibles, further emphasizing that there are different types of arc faults.

Arc faults have been detected on the basis of monitoring the current or voltage of the electrical circuit to be protected. It is important to distinguish signals from arcing conditions that would result in the ignition of combustibles from arc-mimicking signals caused in normal everyday use, such as arcs produced by motor brushes or the toggling of wall switches, or by environmental factors such as lightning. The arc fault circuit interrupter may inadvertently trip in response to high energy arc-mimicking signals, occurring either upstream or downstream of the arc fault circuit interrupter, that present a signal to the arc fault detector that is normally unique to true A-type or B-type arcing conditions.

Many methods are well known in the prior art for identifying the type of arc, de-sensitizing detection of arc-mimicking noise, and determining whether the arcing condition or arc-mimicking condition is upstream or downstream, such as, for example, are disclosed in U.S. patent application Ser. No. 09/828,622 filed Apr. 6, 2001 and entitled AFCI DEVICE WHICH DETECTS UPSTREAM AND DOWNSTREAM SERIES AND PARALLEL ARC FAULTS; U.S. patent application Ser. No. 09/788,206 filed Feb. 16, 2001 and entitled ARC FAULT CIRCUIT INTERRUPTER RECOGNIZING ARC NOISE BURST PAT- TERNS; U.S. patent application Ser. No. 09/776,582 filed Feb. 2, 2001 and entitled AFCI WHICH DETECTS AND INTERRUPTS LINE SIDE ARCING; U.S. patent application Ser. No. 09/990,809 filed Nov. 16, 2001 and entitled ARC FAULT CIRCUIT DETECTOR HAVING TWO ARC FAULT DETECTION LEVELS; and U.S. patent application Ser. No. 09/992,055 filed Nov. 14, 2001 and entitled UPSTREAM/DOWNSTREAM ARC FAULT DISCRIMINATOR, each of which is incorporated herein by reference.

SUMMARY OF THE INVENTION

Briefly stated, a protection device for an electrical circuit having a load includes a sensor operatively associated with the electrical circuit to sense current changes and voltage fluctuations in the electrical circuit. A detector receives input from the sensor and compares the input to known arc fault signatures and arc fault mimicking signatures to determine what category of arc fault or mimicked arc fault occurs. The detector then produces an encoded output signal indicative of the category of arc fault or mimicked arc fault. Categories of arc faults include upstream or downstream series, downstream parallel, downstream line to line, and downstream line to ground.

According to an embodiment of the invention, a device for detecting an electrical fault in a power line having electrical faults includes detection means for detecting a category and location of an occurring fault; and output means for outputting a unique code associated with each different fault category and location detected.

According to an embodiment of the invention, a protection device for an electrical circuit having a load includes a sensor operatively associated with the electrical circuit which senses current changes and voltage fluctuations in the electrical circuit; and a detector which receives input from the sensor and compares the input to known arc fault signatures to determine what category of arc fault occurs; wherein the detector produces an encoded output signal indicative of the category of arc fault.

According to an embodiment of the invention, a plurality of arc fault protective devices protective of an electrical circuit includes an array of sensors disposed at least two different locations in the electrical circuit for sensing a variety of arc fault signatures; an array of detectors operatively associated with the array of sensors for detecting which category of arc faults are indicated by the sensed arc fault signature; wherein the array of detectors produces encoded output signals indicative of the category of arc fault.

According to an embodiment of the invention, a protection device for an electrical circuit having a load includes a sensor operatively associated with the electrical circuit which senses ranges of current to ground; and a detector which receives input from the sensor, wherein the detector produces encoded output signals unique to each range.

According to an embodiment of the invention, a testing device for testing an electrical circuit having a load and an electrical protector therein that protects the electrical circuit from a variety of arc faults is equipped to receive encoded signals from the electrical protector for identifying a category of arc fault.

According to an embodiment of the invention, a protection device for an electrical circuit having a load includes a sensor operatively associated with the electrical circuit which senses current and/or voltage fluctuations in the electrical circuit; and a detector which receives input from the sensor for detecting signatures associated with glowing connections, wherein the detector produces a unique encoded output signal indicative of the glowing connection.

According to an embodiment of the invention, a testing device for testing an electrical circuit having a load and an electrical protector therein responsive to arc faults and/or arc mimicking faults is equipped to receive encoded signals from the electrical protector for identifying an upstream or downstream location of the arc or arc-mimicking fault.

According to an embodiment of the invention, a method for detecting an electrical fault in an electrical circuit includes the steps of (a) sensing current changes and voltage fluctuations in at least one location in the electrical circuit; (b) detecting what category of fault occurs by comparing the current changes and voltage fluctuations to known arc fault signatures; and (c) outputting a unique code associated with each different fault detected.

DETAILED DESCRIPTION OF THE PREFERRED EMBODIMENT

Figure 1:
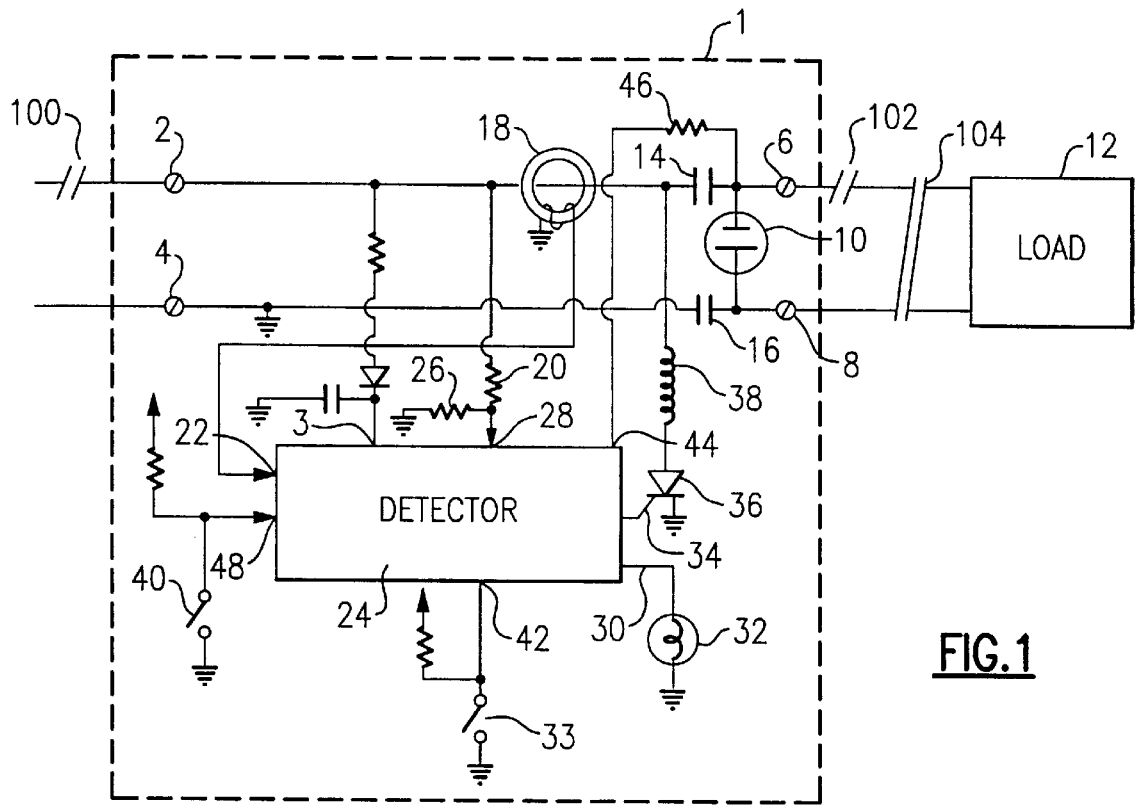
FIG. 1 shows a schematic diagram of a fault detector and indicator device according to an embodiment of the invention.

Referring to FIG. 1, an arc fault circuit device is shown generally at 1. A power source from the electrical circuit having line and neutral conductors are connected respectively to line terminals 2 and 4 of the device. The circuit between the voltage source and line terminals 2, 4 is commonly designated "upstream" or "hitherward." The device is optionally provided with a set of normally closed contacts 14, 16 for connecting the power source to load terminals 6, 8 of the device for connection to a load 12, and/or to a receptacle 10 integral to the housing of the device, either of which are designated as "downstream" or "thitherward." Terminals 2 and 4 are optionally receptacle blades if device 1 is arc fault plug.

Device 1 is provided with a current sensor 18 for sensing current to load 12. Current sensor 18 is connected to an input 22 of a detector 24. Arc fault circuit device 1 is powered from the power source generally as shown at a terminal 3 of detector 24. Detector 24 is preferably a microprocessor with appropriate input and output buffering circuits that is programmed to recognize the salient characteristics of arc fault signals and optionally ground fault signals. Detector 24 can be implemented as software programmed into hardware, as firmware, or as hardware. The supply voltage across line input terminals 2 and 4 is optionally attenuated by a voltage divider shown here as including resistors 20 and 26 at an input 28 to detector 24.

Detector 24 is responsive to current and voltage signals at detector inputs 22 and 28 respectively. Detector 24 includes a code output terminal 30 that produces a signal indicative of the conditions observed at inputs 22 and 28 of detector 24. Such code is optionally saved by detector 24 after a reset button 33 is manually depressed, thus allowing the condition to be read out at a later and/or more convenient time by a computer, portable testing device, monitoring device, or remote monitoring device connected to a monitoring port integral to the arc fault circuit interrupter or through the conductors of the electrical distribution system by way of a modem, with the monitoring device receiving its signal from output terminal 30 of detector 24. Thus, a person monitoring the electrical distribution system at a remote location or a serviceman affixing the portable testing device to output terminal 30 can determine the category and location of the fault.

The electrical distribution system may contain an array of arc fault devices in circuit breaker, box, or receptacle housings. If more than one arc fault device responds to a given arc fault condition, the plurality of encoded signals received by the remote monitor would provide additional insight for locating the fault to facilitate repair. Alternatively, output 30 is connected to a lamp indicator 32 as shown, which may either complement the remote monitor or replace the need for a remote monitor.

Reset button 33 is optionally fully electronic as shown, producing a signal at an input 42 of detector 24. Alternatively, a solenoid 38 along with contacts 14 and 16 comprise a mouse-trap type mechanism, with a reset button to effect closure of contacts 14 and 16 through a set of mechanical linkages, in which case a load voltage sensor 46 is optionally employed. Voltage sensor 46 establishes the open or closed status of contacts 14 and 16 by the presence or absence of voltage, respectively, at terminal 6, and communicates the status to an input 44 of detector 24. The encoded signal at output 30 of detector 24 is preferably saved until the contact closure signal is detected at input 44 of detector 24. The reset button may be integral to the arc fault device housing or located in the remote monitor.

Detector 24 is optionally equipped with an output 34 to trigger a switch such as SCR 36 in response to the stated conditions to enable solenoid 38 to open contacts 14 and 16, thereby disconnecting load 12 from the source of power. Detector 24 combined with SCR 36 and solenoid 38 is known as an arc fault circuit interrupter.

The code at output 30 is determined by the relationship between the signals at inputs 22 and 28 of detector 24, as determined by the relationships of the current sensed by sensor 18 and fluctuations in the supply voltage, respectively, across terminals 2 and 4. If there is a fluctuation in the supply voltage proportionally exceeding the change in current sensed by sensor 18, detector 24 establishes that the cause of the fluctuating voltage is on the line side of the device, producing a distinctive code at output 30 to designate the fault location. Conversely, if there is a change in current from sensor 18 but the line voltage is unchanged, detector 24 establishes that the cause of the fluctuation is on the load side of the device. If detector 24 is equipped with output 34, either of these conditions optionally causes a signal at output 34 of detector 24 for operating SCR 36, causing solenoid 38 to open contacts 14 and 16.

A test button 40 optionally provides a signal to an input 48 of detector 24. Closing test button 40 preferably produces a simulated arc fault signal for testing the operative status of sensor 18, detector 24, SCR 36, and solenoid 38. Proper response to the test button is optionally demonstrated by a unique code indication at output 30 of detector 24.

The invention as described is useful in an arc fault circuit device where it is desirable to physically locate the series or parallel arc fault or arc mimicking fault condition to facilitate repair. Series faults 100 and 102 are shown in located upstream and downstream, respectively, of the arc fault device. As previously described, arc faults produce a sputtering condition in the current. Whereas the current sensed by sensor 18 is the same in either case, the voltage variation at input 28 to detector 24 is entirely different. Since the current through series fault 102 is limited by the impedance of load 12 to thirty amperes or less (because otherwise the overcurrent protection device, e.g., fuse or circuit breaker, will have already tripped if the current exceeds 30 amperes) the presence or absence of a 30 ampere sputtering current has little effect on the supply voltage, wherein the supply voltage is able to source at least 500 amperes. Since series arc fault 100 is on the line side of the arc fault device, sputtering arcs from the fault randomly produce an alternating conductive and non-conductive condition, thereby causing a wide fluctuation in the supply voltage across line terminals 2 and 4 as sensed at input 28 to detector 24. Line and load series arc faults are discernable thereby, allowing differing and associative codes to be produced at output 30 of detector 24. If interrupting contacts 14, 16 are provided, SCR 36 is triggered which energizes solenoid 38 to open contacts 14, 16, thereby interrupting the current to load 12 to terminate arc current 100 or 102. In this manner, an arc fault is safely terminated to prevent the occurrence of a fire, and the location of the fault is identified through the code signal at output 30 of detector 24 to facilitate repair of the fault.

A parallel arc fault 104 occurring across load 12 is discernable by a sputtering current exceeding 75 amperes, which is sensed by current sensor 18. The high current above the handle rating of the protective device preferably establishes yet another code at output 30 of detector 24 which is indicative of yet another fault condition, thereby facilitating the location and repair of the parallel fault condition.

Detector output 24 is optionally connected to an indicator lamp 32 as previously described. An example of code at detector output 30 is for a single blink of lamp 32 on two second intervals to indicate downstream series arc faults, a double blinking pattern to indicate downstream parallel arc faults, a triple blinking pattern to represent depression of the test button 40, and a quadruple blinking pattern to represent upstream series arc faults. Output 30 could alternatively be used to trigger an audio tone. Or the signal at output 30 could be a voltage pulse, with the type of fault and its location encoded in the width of the voltage pulse. Regardless of the encoding method, the variety of code patterns is particularly useful for an outlet branch AFCI as described in standard 1699 which must detect and interrupt a plurality of conditions, but is also useful for other arc fault circuit interrupter embodiments that may not be required to respond to as many conditions.

Figure 2:
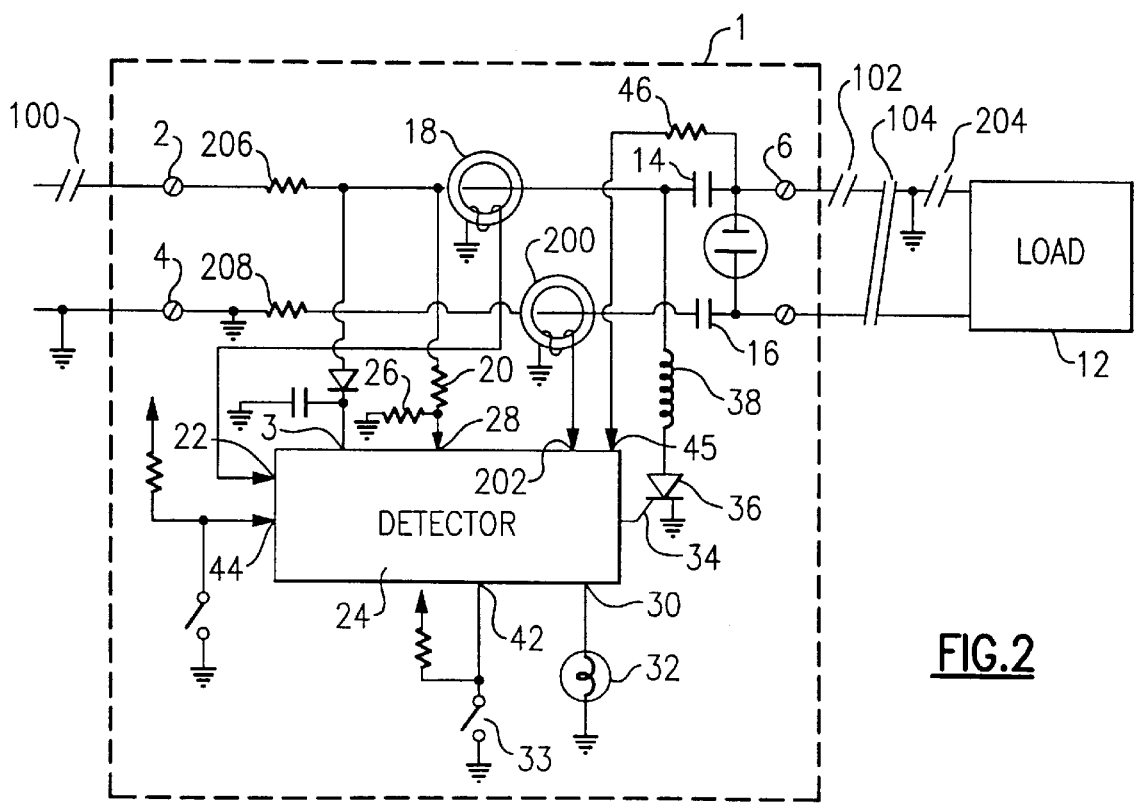
FIG. 2 shows a schematic diagram of a fault detector and indicator device according to an embodiment of the invention.

Referring to FIG. 2, a schematic of another embodiment of an arc fault device is shown in which components that provide the same function as in FIG. 1 bear like identifications. Series and parallel arc faults can be considered to be two broad classifications of arc faults each representing a variety of arc fault conditions having individual arc fault signatures. The more that the arc fault characteristics can be differentiated by the arc fault device and interpreted by a local indicator, a remote monitor or an arc fault tester, the easier it becomes to locate the arcing condition to facilitate repair of the electric circuit. As previously described, parallel arc faults may occur between line to neutral or line to ground. These two types of parallel arc faults can be distinguished and given distinctive codes at code output 30 of detector 24. Current sensor 18 senses the current through load 12 as previously described, by specifically sensing the current through one of the line conductors of the electrical circuit. A current sensor 200 senses current on another of the line conductors and provides a signal to an input 202 of detector 24 in the same manner as current sensor 18 provides a signal to input 22 of detector 24. A line to neutral parallel arcing condition 104 is identifiable by detector 24 as a presence of signal from both current sensors 18 and 200. A line to ground parallel arcing condition 204 is identifiable by detector 24 as a signal from only one of sensors 18, 200.

Figure 3:
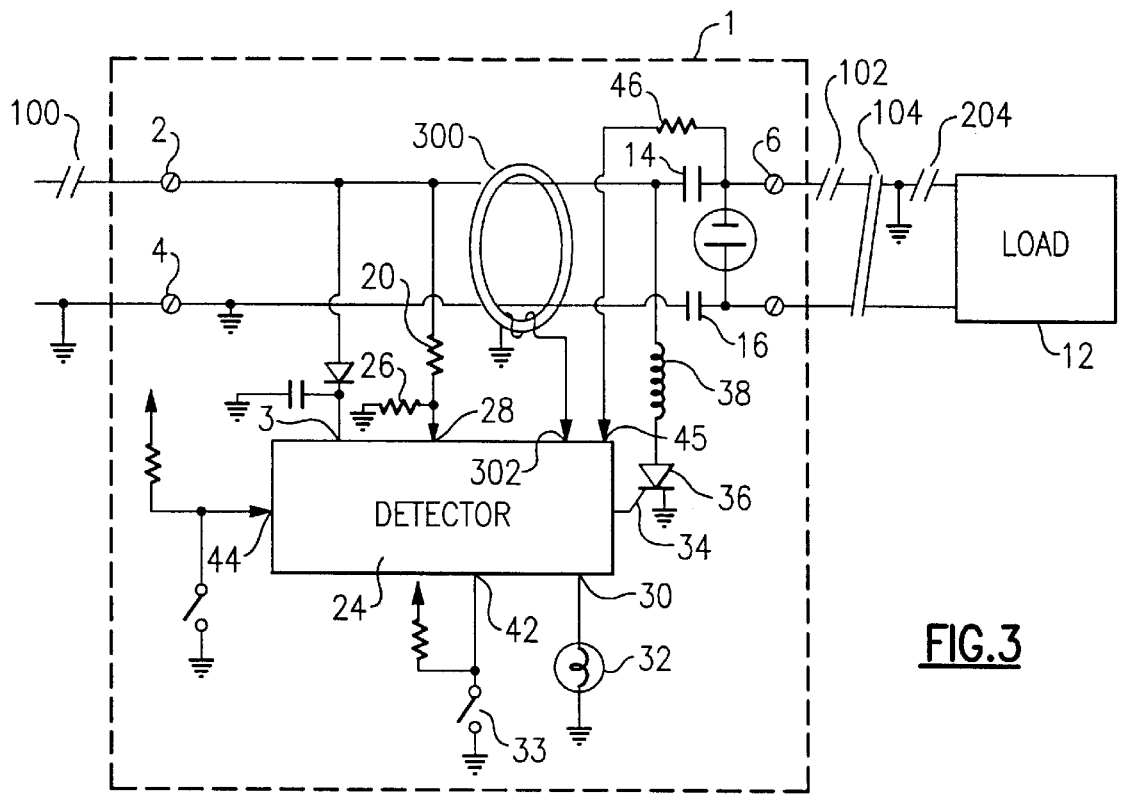
FIG. 3 shows a schematic diagram of a fault detector and indicator device according to an embodiment of the invention.

Referring to FIG. 3, an alternate embodiment to FIG. 2 is shown in which the two sensors 18, 200 are replaced by a single toroidal transformer 300, known as a "differential transformer" surrounding the two line conductors 2, 4. A parallel arcing condition 104 between the line conductors produces equal and opposite currents on the line conductors through toroidal transformer 300 so that there is signal cancellation and absence of signal at an input 302 of detector 24. A parallel arcing condition 204 from line conductor 2 to ground produces a current on only one of the line conductors, resulting in the presence of signal at input 302 of detector 24. Alternately, the asynchronous transformer as described in U.S. Pat. No. 6,266,219 "Combination Ground Fault And Arc Fault Circuit Interrupter", incorporated herein by reference, may be used to detect ground faults, line to ground arc faults, and line to line arc faults. Types of parallel arcing conditions are thereby distinguished.

As yet another alternative to the two current sensors shown in FIG. 2, sensors 18 and 200 could be replaced by a small current viewing series resistance placed in series with either the hot, neutral, or both wires, and commonly referred to as a shunt, and shown as series resistors 206, 208 in conductors 2, 4, respectively, as disclosed in part in U.S. patent application Ser. No. 09/990,809 filed Nov. 16, 2001 and entitled ARC FAULT CIRCUIT DETECTOR HAVING TWO ARC FAULT DETECTION LEVELS, previously incorporated herein. Shunt 206 in the hot wire located between terminals 2 and 6 produces a signal in response to current flow in the hot wire. The signal is applied to an input of an operation amplifier (not shown) floating above the circuit ground. The amplified signal is then coupled to detector 24 through an isolation means (not shown) such as an opto-isolator coupler.

In addition, the signal from transformer 300 can be used to determine whether a ground fault occurs. UL standard 943 requires a ground fault circuit interrupter (GFCI) to trip when a ground fault current equals or exceeds 6 milliamps. Based on the signal from transformer 300, detector 24 can determine the amplitude of any ground fault current and trip interrupting contacts 14, 16 when the ground fault current equals or exceeds 6 milliamps. Detector 24 can also send a unique code to output 30 indicative of the type of fault, as well as the amplitude or range of amplitudes of the ground fault current. If the ground fault current is less than 6 milliamps, a unique code at output 30 can indicate that condition as well. The location of any ground fault sensed by transformer 300 is downstream of device 1.

FIG. 2 and FIG. 3 are representative of only a few ways for distinguishing types of parallel arc faults, including faults on multi-wire circuits.

Figure 4A:
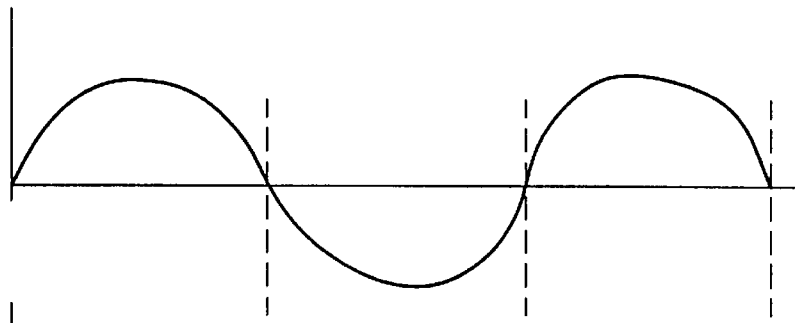
FIG. 4A shows a the sinusoidal current through a load produced by the supply voltage of the electrical distribution system without an arcing fault condition.
Figure 4B:
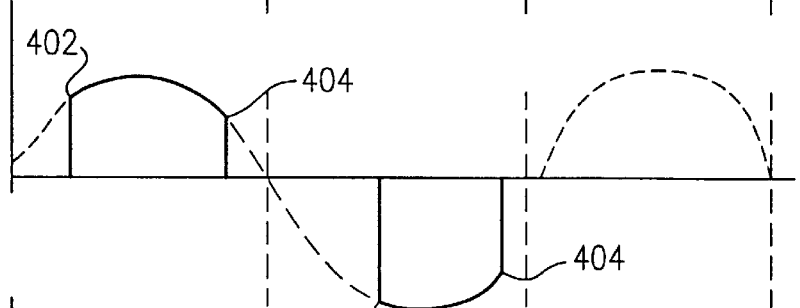
FIG. 4B shows the sputtering current through the load associated with an arc that involves carbon.
Figure 4C:
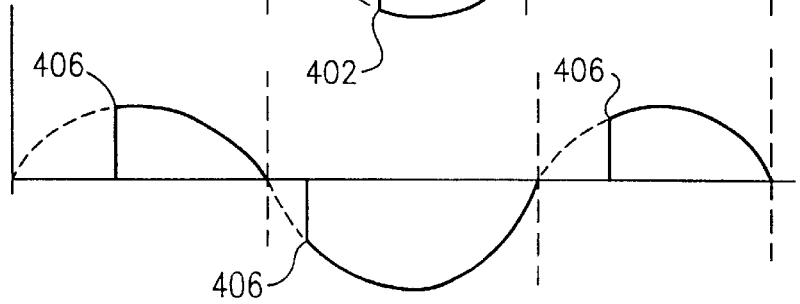
FIG. 4C shows the sputtering current through the load associated with an arc that does not involve carbon.

Referring to FIGS. 4A–4C, the broad classification of series arc faults also represents a variety of conditions that can be distinguished. FIG. 4A represents the sinusoidal current through load 12 produced by the supply voltage of the electrical distribution system without an arcing fault condition. FIG. 4B represents the sputtering current through load 12 associated with an arc that involves carbon, in which there are distinctive arc start edges 402 following at random the zero crossing, and arc cessation edges 404 preceding the next zero crossing. The carbon in the arcs associated with carbon develops through the carbonization of flammable materials, which typically involve wire nuts or frayed electrical cords. FIG. 4C represents the sputtering current through load 12 associated with an arc that does not involve carbon, in which there are distinctive arc start edges 406 following at random the zero crossing but without arc cessation edges. Arcs in the absence of carbon typically involve loose-metal-against-metal terminals which can maintain an arc across a small series arc fault gap until very close to the following current zero cross, which action causes the weak arc cessation edges, as opposed to arcing carbon which tends to increase the arcing air gap as carbon is oxidized by the arc, or blown clear by the sputtering action of the arc. Arcs in the absence of carbon also manifest as a phenomenon known as glowing connections in which a terminal becomes resistive and glows while conducting current.

A glowing connection typically requires many hours of operation before the fault causes a fire. During this time, a significant percentage of these normally undetectable faults break into series arcing from physical vibration of the loose connection. These vibrations can be caused by movement of a plug attached to a receptacle undergoing a glowing connection or by vibrations caused by such actions as a closing door. When this occurs, the momentary series arc is detected by the embodiments of this invention, which causes tripping and opening of interrupter contacts 14 and 16, thereby breaking the circuit and extinguishing the glowing connection. The various signals produced by current sensors 18 or 200 or the shunts described above are interpreted by detector 24 to identify the type of fault and provide a family of coded signals to detector 24 code output 30. Other signatures are known to those skilled in the art.

Figure 5:
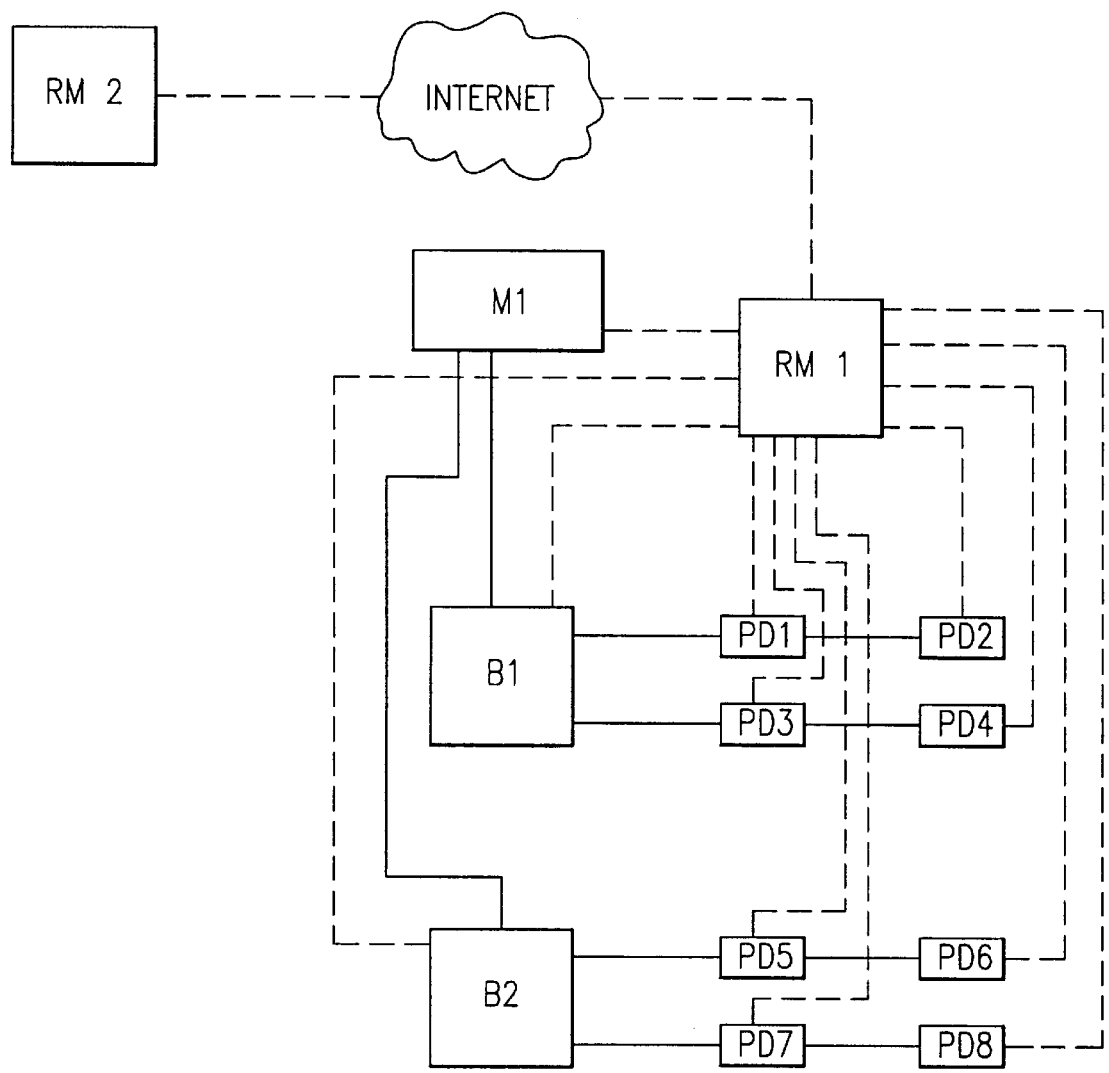
FIG. 5 shows a block diagram of a remote monitoring system according to an embodiment of the invention.

Referring to FIG. 5, a block diagram shows how a remote monitoring system could be established according to an embodiment of the invention. A building main M1 shows two feeder circuits providing power to overcurrent protection devices breaker B1 and breaker B2. Breaker B1 is shown with two branch circuits, one protected with protection devices PD1, PD2 with the other protected with protection devices PD3, PD4. Similarly breaker B2 is shown with two branch circuits, one protected with protection devices PD5, PD6 with the other protected with protection devices PD7, PD8. Protection devices PD1–PD8 are preferably AFCI's or AFCI/GFCI's according to the embodiments of the invention described above.

Building main M1, breakers B1–B2, and protection devices PD1–PD8 are preferably connected to a remote monitoring device RM1 as shown in FIG. 5 by the dashed lines. Remote monitoring device RM1 is preferably located in the building within a security monitoring room or co-located with the building's fire alarm control panel (FACP). The connections can be via signal wires in similar fashion as FACP's are connected to fire alarm pull boxes and smoke detectors. Alternately, each main, breaker, and device could be connected via wireless transmitters to remote monitor RM1. Another optional connection could be done via power line communication technology, although this method of connection has the disadvantage that the arc fault itself can disrupt the signal. The signals are the encoded output signals from detector 24, which can be binary, hex, or ASCII coded signals.

A remote monitor RM2 is shown connected to remote monitor RM1 via the Internet. ASCII coded signals from detector 24 sent via the Internet would permit monitoring the status of the various devices anywhere in the world by a monitoring or security service. In this case, remote monitor RM1 preferably acts as the Internet interface. Thus, the encoded output signal from detector 24 permits diagnosing the type and probable location of the fault at remote monitor RM1 and/or remote monitor RM2.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A device for detecting an electrical fault in a power line having electrical faults, comprising:
   detection means for detecting a category and location of an occurring fault; and
   output means for outputting a unique code associated with each different fault category and location detected.

2. A device as in claim 1, wherein said output code drives one or more indicators.

3. A device as in claim 1, wherein said detection means detects a ground fault current.

4. A device as in claim 1, wherein said detection means includes a current sensor and a voltage sensor.

5. A device as in claim 4, wherein said detection means detects sputtering currents indicative of arc faults.

6. A device as in claim 4, wherein said detection means detects voltage fluctuations indicative of arc faults.

7. A device as in claim 4, further comprising means for determining a relationship between said sputtering currents and said voltage fluctuations, wherein said relationship causes a unique blinking pattern in an indicator.

8. A device as in claim 7, further comprising a test button, wherein pressing said test button causes a characteristic blinking pattern in said indicator.

9. A device as in claim 7, wherein said blinking pattern distinguishes between upstream series arc faults, downstream series arc faults, and parallel arc faults.

10. A device as in claim 7, further comprising a reset button which resets said indicator.

11. A device as in claim 1, wherein said output means includes interrupting means for interrupting said power line to eliminate said electrical fault.

12. A device according to claim 1, further comprising diagnostic means for reading each unique code outputted by said output means.

13. A device according to claim 12, wherein said diagnostic means includes one of a blinking light, a portable tester, a monitoring device, and a computer.

14. A protection device for an electrical circuit having a load, comprising:
   a sensor operatively associated with said electrical circuit which senses current changes and voltage fluctuations in said electrical circuit; and
   a detector which receives input from said sensor and compares said input to known arc fault signatures to determine what category of arc fault occurs;
   wherein said detector produces an encoded output signal indicative of said category of arc fault.

15. A device according to claim 14, further comprising an interrupting mechanism operatively associated with said detector, wherein said detector sends a signal to said interrupting mechanism upon detection of one of said arc fault signatures, thereby causing said interrupting mechanism to disconnect said load from said electrical circuit.

16. A device according to claim 15, further comprising a reset button operatively associated with said interrupting contacts, such that activating said reset button enables closure of said interrupting contacts, and wherein said encoded output signal commences upon detection of one of said arc fault signatures and terminates upon closure of said interrupting contacts.

17. A device according to claim 14, further comprising a test button for a test that enables a simulated arc fault signature, whereby a unique encoded output signal is produced by said detector in response to said simulated arc fault signature upon satisfactory completion of said test.

18. A device according to claim 14, wherein said sensor senses a variety of arc fault mimicking signatures, wherein said detector detects said variety of arc-fault mimicking signatures, and wherein said encoded output signal is indicative of which category of arc fault-mimicking signature is present.

19. A device according to claim 18, wherein said encoded output signal indicates if said arc-fault mimicking signature is generated upstream or downstream of said device.

20. A device according to claim 18, further comprising a remote monitoring device, wherein said monitoring device receives said encoded output signal from said detector, and wherein said remote monitoring device interprets said category of arc-mimicking fault signature therefrom.

21. A device according to claim 14, wherein said encoded output signal indicates if said arc fault is upstream or downstream of said device.

22. A device according to claim 14, wherein said encoded output signal indicates whether said arc fault signature is produced by a series or a parallel arc fault.

23. A device according to claim 14, wherein said encoded output signal is sent to one of a blinking light, a portable tester, a monitoring device, and a computer.

24. A device according to claim 14, further comprising a reset button, wherein said encoded output signal terminates upon an actuation of said reset button.

25. A device according to claim 14, further comprising a lamp indicator, wherein said encoded output signal includes a family of repeating blinking patterns visibly discernable from said lamp indicator.

26. A device according to claim 14, further comprising a remote monitoring device, wherein said remote monitoring device receives said encoded output signal from said detector.

27. A device according to claim 26, further comprising:
   an arc fault detector housing; and
   a monitoring port integral to said arc fault detector housing;
   wherein said remote monitoring device receives said encoded output signal via said monitoring port.

28. A device according to claim 26, further comprising a modem for communicating said encoded output signal from said detector to said remote monitoring device.

29. A device according to claim 26, wherein said encoded output signal includes a pulse train whose pattern is discernable by said remote monitoring device.

30. A device according to claim 26, wherein said encoded output signal includes a pulse whose pulse width is discernable by said remote monitoring device.

31. A device according to claim 14 in which said sensor is a current sensor that monitors the current through said load.

32. A device according to claim 31, further comprising:
a plurality of line terminals for connection of said device to a voltage supply of said electrical distribution system; and
a voltage sensor for monitoring a voltage across said line terminals;
wherein signals from said voltage sensor and said current sensor are interpreted by said detector to determine whether said arc fault is upstream or downstream of said device.

33. A device according to claim 31, further comprising:
a plurality of line terminals for connection of said device to a voltage supply of said electrical distribution system; and
a voltage sensor for monitoring a voltage across said line terminals;
wherein signals from said voltage sensor and said current sensor are interpreted by said detector to determine whether said signals are indicative of an arc-fault mimicking generator, and whether said generator is upstream or downstream of said device.

34. A device according to claim 15, wherein said device is housed in one of a receptacle, circuit breaker, box, and plug.

35. A plurality of arc fault protective devices protective of an electrical circuit, comprising:
an array of sensors disposed at at least two different locations in said electrical circuit for sensing a variety of arc fault signatures;
an array of detectors operatively associated with said array of sensors for detecting what category of arc faults are indicated by said sensed arc fault signature;
wherein said array of detectors produces encoded output signals indicative of said category of arc fault.

36. A device according to claim 35, further comprising a remote monitor, wherein said encoded output signals are analyzed to determine a probable location of said arc fault.

37. A device according to claim 35, wherein said plurality of devices are housed as a combination of receptacles, circuit breakers, boxes, and plugs.

38. A protection device for an electrical circuit having a load, comprising:
a sensor operatively associated with said electrical circuit which senses current changes and/or voltage fluctuations in said electrical circuit; and
a detector which receives input from said sensor and compares said input to known arc fault mimicking signatures to determine what category of mimicked arc fault occurs;
wherein said detector produces an encoded output signal indicative of said category of mimicked arc fault.

39. A protection device for an electrical circuit having a load, comprising:
a sensor operatively associated with said electrical circuit which senses ranges of current to ground; and
a detector which receives input from said sensor,
wherein said detector produces encoded output signals unique to each range.

40. A device according to claim 39, wherein one of said ranges is associative with arc faults.

41. A testing device for testing an electrical circuit having a load and an electrical protector therein that protects said electrical circuit from a variety of arc faults, wherein said testing device is equipped to receive encoded signals from said electrical protector for identifying a category of arc fault.

42. A device according to claim 41, wherein said testing device and said electrical protector are in separate housings.

43. A device according to claim 41, further comprising an indicator, wherein said encoded signal is discernable from said indicator.

44. A device according to claim 41, wherein said testing device is equipped to receive encoded signals for identifying a location of said arc fault.

45. A device according to claim 41, wherein said variety of arc faults includes a glowing connection fault.

46. A protection device for an electrical circuit having a load, comprising:
a sensor operatively associated with said electrical circuit which senses current and/or voltage fluctuations in said electrical circuit; and
a detector which receives input from said sensor for detecting signatures associated with glowing connections,
wherein said detector produces a unique encoded output signal indicative of said glowing connection.

47. A device according to claim 46, wherein said detector produces an encoded output signal indicative of a location of said glowing connection.

48. A testing device for testing an electrical circuit having a load and an electrical protector therein responsive to arc faults and/or arc mimicking faults, wherein said testing device is equipped to receive encoded signals from said electrical protector for identifying an upstream or downstream location of said arc or arc-mimicking fault.

49. A method for detecting an electrical fault in an electrical circuit, comprising the steps of:
sensing current changes and voltage fluctuations in at least one location in said electrical circuit;
detecting what category of fault occurs by comparing said current changes and voltage fluctuations to known arc fault signatures; and
outputting a unique code associated with each different fault detected.

50. A method according to claim 49, wherein said step of detecting includes comparing said current changes and voltage fluctuations to known arc fault mimicking signatures, and wherein said step of outputting includes outputting a unique code associated with each different mimicked arc fault detected.

51. A method according to claim 50, wherein said step of detecting includes determining whether said mimicked arc fault occurs upstream or downstream of said at least one location.

52. A method according to claim 49, wherein said step of detecting includes determining whether said arc fault occurs upstream or downstream of said at least one location.

53. A method according to claim 52, wherein said step of outputting includes sending said unique code to a monitoring device.

54. A method according to claim 49, wherein said step of outputting includes sending said unique code to a monitoring device.

* * * * *